July 12, 1932. R. MÖLLER 1,866,940
LIQUID PURIFICATION FOR KERR CELLS
Filed Nov. 25, 1929
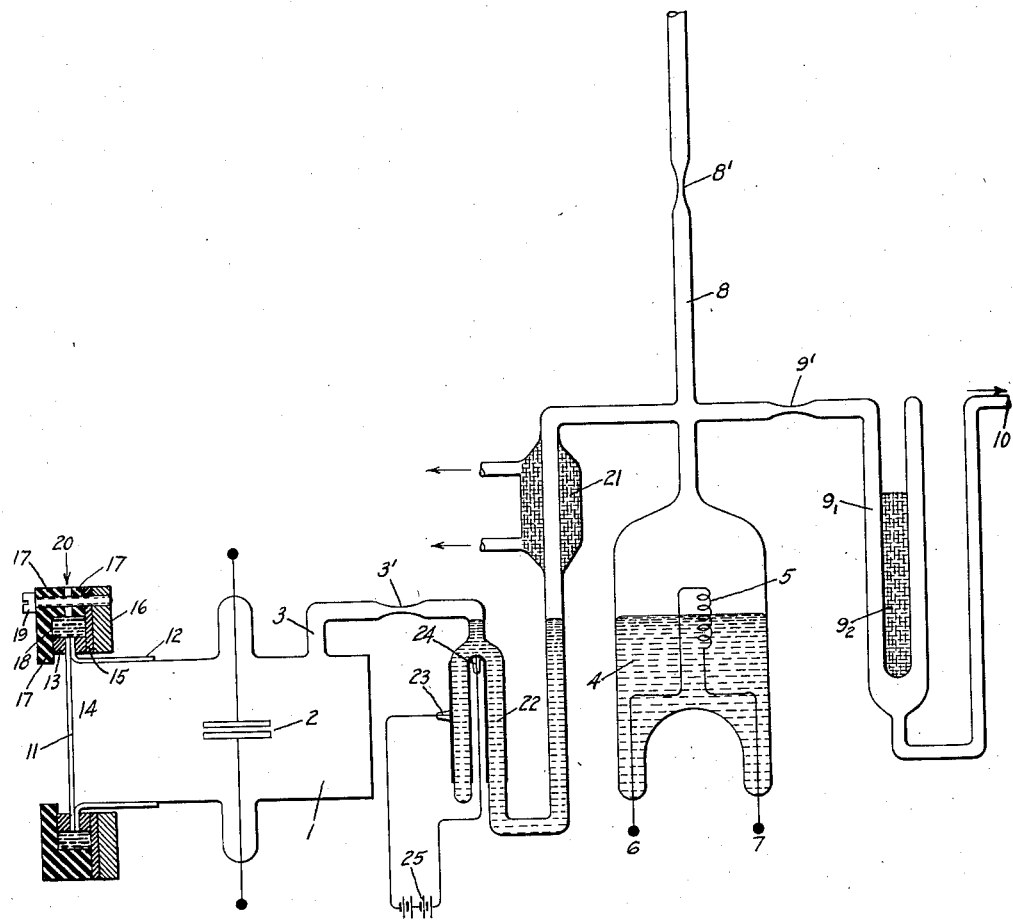
Inventor:
Rolf Möller,
by Charles V. Tullar
His Attorney.

UNITED STATES PATENT OFFICE

ROLF MÖLLER, OF HAMBURG, GERMANY, ASSIGNOR TO GENERAL ELECTRIC COMPANY, A CORPORATION OF NEW YORK

LIQUID PURIFICATION FOR KERR CELLS

Application filed November 25, 1929, Serial No. 409,631, and in Germany December 6, 1928.

My invention relates to the manufacture of Kerr cells and particularly to purification of the liquid employed in the cells.

It is known that a Kerr cell may be utilized for the purpose of transforming electrical impulses into light impulses. Such a cell includes two or more electrodes or plates suitably spaced from one another and immersed in a doubly refracting medium which may be nitrobenzol or the like. In the past, difficulty has been encountered due to increase in the electrical conductivity of the doubly refracting medium this increase in conductivity being produced by water or other impurities which are absorbed from the air and which tend both to cause overheating of the media and to decrease its transparency.

The present invention is an improvement on that disclosed by a copending application, Serial No. 368,164 filed June 3, 1929. In accordance with the invention disclosed by the aforesaid application the disadvantages mentioned above are minimized by thoroughly purifying the doubly refracting medium and enclosing it together with the electrodes in a highly evacuated receptacle. The present invention is an improvement on that disclosed by the aforesaid application and relates more particularly to the provision of means for more thoroughly purifying the medium. To this and after the water is removed the liquid medium is subjected to an electrical purifying operation on its way from the storage condenser to the cell for the purpose of removing any conducting constituents which may still be present in it. The conductivity of the liquid medium is thus further reduced to a considerable degree and when an electrical current is sent through the cell its electrical characteristics are constant from the beginning of its operation. If the electrical purification were omitted, a comparatively large current would flow in at the liquid in the cell at the beginning of its operation due to the conducting impurities which are only removed electrolytically.

My invention will be better understood from the following description when considered in connection with the accompanying drawing and its scope will be pointed out in the appended claims.

The single figure of the drawing illustrates an apparatus wherein my invention has been embodied.

The cell includes a glass receptacle 1 and electrodes 2 which are supported by suitable leads sealed into the wall of the receptacle. By means of a connecting pipe 3, the receptacle 1 is connected through a contraction 3' with the storage receptacle 4 and through the opening of a cooling receptacle $9_1$ with the air-pump inlet 10. Within the storage receptacle 4 a spiral 5 of metallic wire is provided for the purpose of electric heating, which wire may for instance be of platinum, to which current is fed through the leads through 6 and 7.

After the whole glass apparatus has been thoroughly cleaned with alcohol or other suitable cleaner and carefully dried, the doubly refracting medium, such for example as nitrobenzol is filled into the storage receptacle 4 through the feed-pipe 8, advantageously, of course, the purest liquid to be obtained in commerce. The heating spiral 5 is advantageously so disposed, as to be in a vertical position and to extend partially out of the liquid. After the pipe 8 has been sealed off at the contraction 8', the receptacle is evacuated. The air contained in the nitrobenzol is freed and drawn off by suction, passing over the cooling receptacle $9_1$, which prevents the nitrobenzol vapors from passing into the airpump. After the air has been removed, the nitrobenzol is heated to the boiling point by means of the heating spiral 5, in which connection, the water contained in the same escapes, owing to its lower boiling point. The water vapors are drawn off by suction.

A cooling vessel 21 and a double-walled receptacle 22 are disposed between the storage container 4 and the cell 1 to serve the purpose of electric purification. The double-wall receptacle is provided with silver electrodes or the like which may be chemically deposited on the walls of the receptacle 22. Direct current may be supplied to the electrodes from a suitable source 25 through the leads 23 and 24.

The vapors thus obtained are condensed in the cooling vessel 21 and collected in the receptacle 22 in which they are subjected to a direct current while being transmitted into the cell 1. The liquid may be subjected to this electrolytic purification for any length of time by suitably operating the apparatus. Also the liquid may be transformed by distillation from the receptacle 22 into the cell 1 in which case a cooling vessel would be required between the vessel 22 and the cell 1.

An improved construction of cooling vessel has been found suitable for carrying the process into effect. This construction corresponds to the cooling vessel 9 of Figs. 2 and 3 of the aforesaid application and is indicated at $9_1$ in the drawing. As indicated by the drawing, this vessel is double-walled and contains a cooling liquid $9_2$ which may be liquid air, for example.

The nitrobenzol thus treated shows a very considerably decreased conductivity in comparison with the purest nitrobenzol on sale. An increase of this conductivity through the absorption of water from the air, is prevented by the air tight closure of the cell receptacle. Also alterations in the conductivity of the nitrobenzol owing to variations of temperature and the resulting pressure variations in the receptacle, and alterations in the contents of water, due to the purification of the liquid, carried through, are excluded.

The fitting in and spacing of the electrodes or condenser plates is facilitated by the cell receptacle construction illustrated by the drawing.

In this case a glass tube 1 open at both ends, serves as cell receptacle. After the leads for the condenser plates 2 have been sealed in, the tube is sealed off at the right hand side, by sealing on a flat glass plate. At the other end of the tube a collar 12 is applied, preferably by sealing on and is ground off flat and on this a flat glass plate 11 rests. In view of the fact that nitrobenzol dissolves the usual cements, a mercury joint is employed. On the outer surface of the glass plate 11 lies a rubber ring 13, at the outer rim of the collar 12 lies a like rubber ring 14 and next to it a rubber ring 15 of somewhat greater outer diameter and furthermore a brass ring 16. A vulcanite ring 17 is laid over the rubber ring, so that an annular space 18 is formed between the hard rubber and the rubber rings. By means of several screws 19, one of which is shown in the drawing, the various rings and thereby the collar 12 and the glass-plate 11 are pressed together by a light pressure. The hollow space 18 can be filled with quicksilver through an opening 20 in the vulcanite ring 17. The boring is then closed by means of a small rubber stopper, or by a stop cock inserted in the opening 20. This stop cock may also replace one of the screws 19.

When the mercury joint has been made, the cell is filled with nitrobenzol in the above described manner and sealed off. Of course, in order to further facilitate the placing in of the condenser plates, the other (right hand) side also of the glass tube 1, in which the condenser plates of the cell are located, could be closed in like manner, by a removable plate with a mercury joint.

With the described construction the cell receptacle can be opened at any time in order to alter the distance apart of the condenser plates for experimental purposes.

For cells, which serve for the transformation of light fluctuations into electrical pressure variations, the arrangement in vacuum in like manner, is advantageous as is also the purification of the liquids to be employed.

What I claim as new and desire to secure by Letters Patent of the United States is:

1. In the making of a Kerr cell, the method of providing the cell receptacle with a liquid having electrooptical properties and having a high degree of purity which comprises heating the liquid and simultaneously removing air and water vapor therefrom, condensing the vapors of the liquid, purifying the condensed vapors by passing them through an electrostatic field and then passing the condensed purified vapors as fast as produced directly into the cell receptacle.

2. Apparatus for purifying liquid used in a Kerr cell comprising a vessel adapted to hold said liquid and having a heater, an exhaust connection with the vessel including a vapor condenser, a vapor condenser connected to the outlet of said vessel, an electrostatic purifying device connected with the latter condenser and means for connecting said device with the cell receptacle whereby the liquid is simultaneously purified and passed into the cell receptacle.

In witness whereof I have hereunto set my hand this 11th day of November, 1929.

ROLF MÖLLER.